United States Patent
Baeza et al.

(10) Patent No.: US 12,292,777 B2
(45) Date of Patent: May 6, 2025

(54) MANAGEMENT OF A LOW-POWER MODE

(71) Applicant: STMicroelectronics (Grand Ouest) SAS, Le Mans (FR)

(72) Inventors: Gerald Baeza, Mulsanne (FR); Pascal Paillet, Le Mans (FR); Loic Pallardy, Rouillon (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 0 days.

(21) Appl. No.: 17/517,382

(22) Filed: Nov. 2, 2021

(65) Prior Publication Data

US 2022/0164016 A1 May 26, 2022

(30) Foreign Application Priority Data

Nov. 20, 2020 (FR) ........................ 2011958

(51) Int. Cl.
*G06F 1/3206* (2019.01)
*G06F 1/324* (2019.01)

(52) U.S. Cl.
CPC ............ *G06F 1/324* (2013.01); *G06F 1/3206* (2013.01)

(58) Field of Classification Search
CPC ...... G06F 1/324; G06F 1/3206; G06F 1/3237; G06F 1/14; Y02D 10/00
See application file for complete search history.

(56) References Cited

U.S. PATENT DOCUMENTS

| 10,172,092 B1 | 1/2019 | Zhou et al. |
| 11,442,524 B1* | 9/2022 | Polisi ............... G06F 1/3237 |
| 2006/0190752 A1* | 8/2006 | Lee ............... G06F 1/3203 |
| | | 713/323 |
| 2009/0045945 A1* | 2/2009 | Yeh ............... G01S 19/24 |
| | | 340/539.13 |
| 2013/0159747 A1* | 6/2013 | Hughes ............... G06F 1/3237 |
| | | 713/322 |
| 2016/0110299 A1 | 4/2016 | Sheafor et al. |
| 2016/0132091 A1* | 5/2016 | Bodner ............... G06F 1/3206 |
| | | 713/323 |
| 2019/0196563 A1 | 6/2019 | Lai |

FOREIGN PATENT DOCUMENTS

| CN | 101950278 A | 1/2011 |
| CN | 102047561 A | 5/2011 |
| WO | 9820620 A1 | 5/1998 |

* cited by examiner

Primary Examiner — Paul Yen
(74) Attorney, Agent, or Firm — Slater Matsil, LLP

(57) ABSTRACT

In an embodiment a method for managing a low-power mode of an electronic device includes at a first request for transitioning an electronic device to a low-power mode, storing values of a first counter and a second counter of the electronic device on a first edge of a first clock and at a second request for transitioning the electronic device out of the low-power mode calculating a number of periods of a second clock between a second edge of the first clock and the first edge, the second edge being later than the first edge and updating the value of the second counter with a calculated value, wherein the first clock drives the first counter and the second clock drives the second counter, the second clock being faster than the first clock.

20 Claims, 3 Drawing Sheets

MANAGEMENT OF A LOW-POWER MODE

CROSS-REFERENCE TO RELATED APPLICATIONS

This application claims the benefit of French Application Number 2011958, filed on Nov. 20, 2020, which is hereby incorporated by reference to the maximum extent allowable by law.

TECHNICAL FIELD

The present disclosure generally concerns electronic circuits and devices and, more particularly, the management of different power consumption modes in an electronic device or system.

BACKGROUND

Current electronic systems and device have a plurality of power consumption levels. In particular, a low-power mode is now generally provided to decrease the power consumption.

SUMMARY

Embodiments provide improved mechanisms for managing the low-power modes of electronic systems and devices.

Embodiments overcome the disadvantages of known mechanisms of low-power mode management, and more particularly of management of time bases in low-power mode.

An embodiment provides a method of management of a low-power mode of an electronic device comprising a first clock for rating a first counter and a second clock for rating a second counter, faster than the first one, comprising the steps of: at a first request for passing to the low-power mode, saving values of the first and second counters on a first edge of the first clock; and at a second request for leaving the low-power mode: calculating the number of periods of the second clock comprised between a second edge of the first clock subsequent to said second request, and the first edge; and updating the value of the second counter with the calculated value.

An embodiment provides an electronic device comprising a first clock for rating a first counter and a second clock for rating a second counter, faster than the first one, configured to: at a first request for passing to the low-power mode, saving values of the first and second counters on a first edge of the first clock; at a second request for leaving the low-power mode: calculating the number of periods of the second clock comprised between a second edge of the first clock, subsequent to said second request, and the first edge; and updating the value of the second counter with the calculated value.

An embodiment provides a computer program product comprising instructions which, when they are implemented by an electronic device comprising a first clock for rating a first counter and a second clock for rating a second counter, faster than the first one, cause: at a first request for passing to the low-power mode, a saving of the values of the first and second counters on a first edge of the first clock; and at a second request for leaving the low-power mode: a calculation of the number of periods of the second clock comprised between a second edge of the first clock, subsequent to said second request, and the first edge; and the update of the value of the second counter with the calculated value.

According to an embodiment, the update of the value of the second counter is performed on an edge of the first clock.

According to an embodiment, the first counter represents a real time clock.

According to an embodiment, the second counter represents a system time used by a processor active outside of the low-power mode.

According to an embodiment, the first clock remains active including in low-power mode, the second clock being deactivated in low-power mode.

According to an embodiment, an operation of saving or of restoring of the value of the second counter is implemented.

According to an embodiment, a low-power mode controller is active including in low-power mode.

According to an embodiment, the calculation of the number of periods of the second clock comprised between said second edge and said first edge takes into account a time of processing of the values of the counters for their saving and restoring.

BRIEF DESCRIPTION OF THE DRAWINGS

The foregoing features and advantages, as well as others, will be described in detail in the following description of specific embodiments given by way of illustration and not limitation with reference to the accompanying drawings, in which.

Like features have been designated by like references in the various figures. In particular, the structural and/or functional features that are common among the various embodiments may have the same references and may dispose identical structural, dimensional and material properties.

DETAILED DESCRIPTION OF ILLUSTRATIVE EMBODIMENTS

For the sake of clarity, only the steps and elements that are useful for an understanding of the embodiments described herein have been illustrated and described in detail. In particular, the components of an electronic system or device adapted to the implementation of the described solutions have not been detailed other than for the needs of the present description, the described embodiments being compatible with any electronic system or device having a standby or low-power mode.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
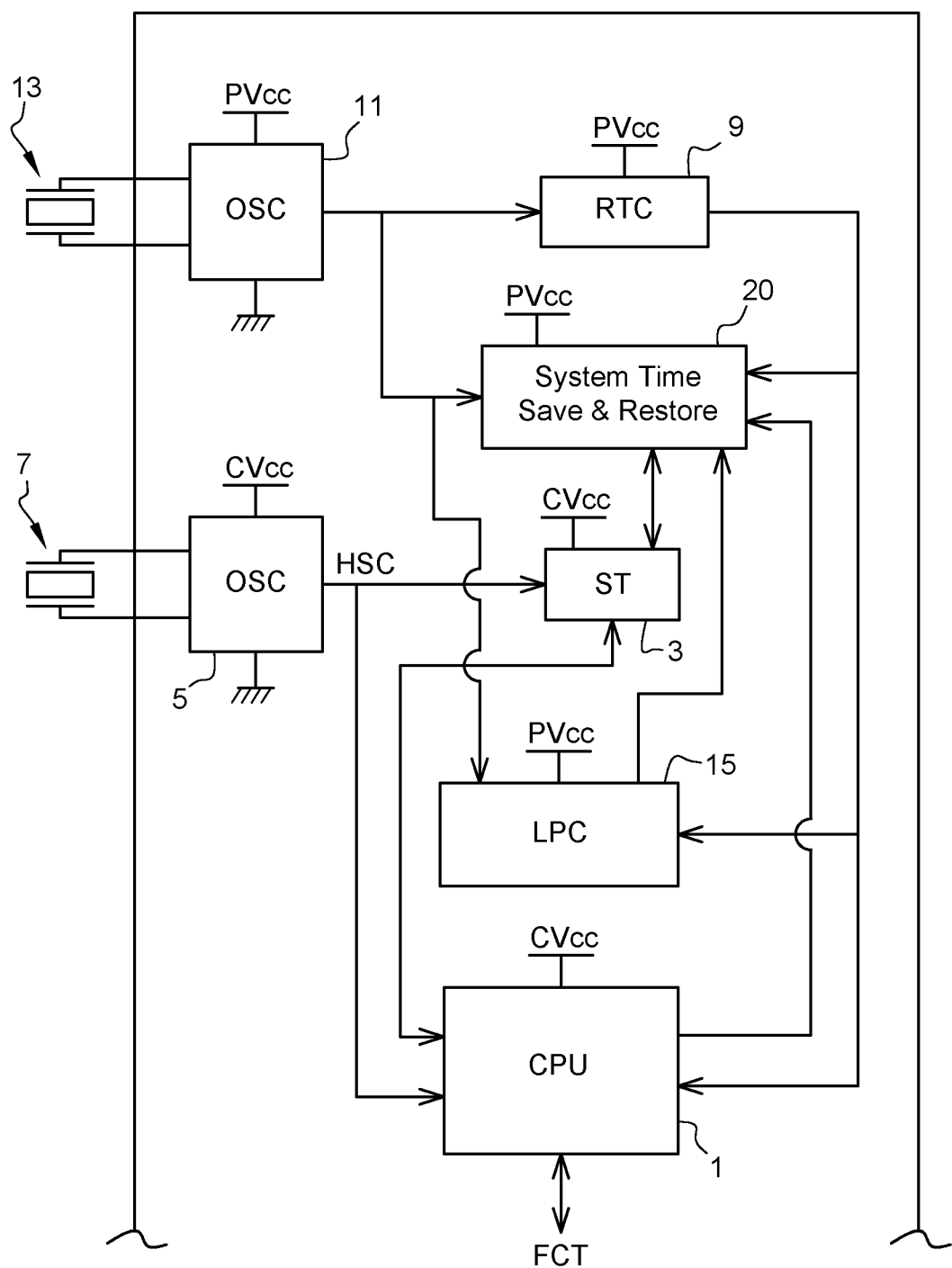
FIG. 1 shows a functional block diagram according to embodiments.

FIG. 1 shows a functional block diagram of an electronic device according to embodiments.

An electronic device of the type to which the described implementation modes and embodiments apply comprises at least one processor 1 (CPU) adapted to implementing at least one operating system to process various FCT functions which depend on the application of the device. For its rating or timing, processor 1 uses a clock of between several hundreds of MHz to a few GHz generally derived (typically via a phase-locked loop—PLL) from a system or high speed clock HSC. High speed clock HSC clocks, counts or rates a register or counter 3 (ST—System Time) supplying the system time or system time base. Clock HSC is generally supplied by an oscillator 5 (OSC) from a quartz 7.

In embodiments of the present disclosure, a clock LSC (Low Speed Clock), slow with respect to clock HSC, clocks, counts or rates the incrementation of the register or counter 9 (RTC—Real Time Clock) and supplies a time base or real time clock, slower than the system time. This low speed clock is also based on an oscillator (OSC) 11 comprising a quartz 13. Real time clock RTC generally has the role of supplying a time count in human units (hours, minutes, seconds, etc.) and thus differs from the system time for rating the operations executed by the device or system.

For simplification, only the system and real time clocks have been illustrated in FIG. 1 and neither the circuits for generating the clock signals for rating the different circuits, particularly of the processor(s), nor these clock signals, have been shown.

Clock LSC is much slower than clock HSC (by a ratio of at least 100, typically in the order of 1,000). For example, the clock LSC rating real time clock RTC has a period in the order of a few tens of microseconds while the clock HSC rating the system time has a period in the order of some hundred nanoseconds.

In order to decrease power consumption, circuits of the device are set to standby or stop being powered in a low-power or low consumption mode. For this purpose, the device generally comprises a controller 15 (LPC—Low Power Controller), dedicated to the low-power mode. This controller has the function of remaining operative in low-power mode and of controlling, at the rate of the real time clock, the execution of the tasks remaining active in low-power mode.

In embodiments of the present disclosure, the circuits are powered by one or the other of two different domains according to whether they are supposed to remain active in low-power mode or not. Thus, in simplified fashion, it is understood that, among the above-described elements, oscillator 11, real time clock counter RTC, and controller 15 are powered with a voltage PVcc considered as permanent while oscillator 5, system clock counter 3, main processing unit 1 are powered with a controllable voltage CVcc. Of course, in practice, voltage PVcc is also controllable since it is delivered by power supply circuits. However, for the needs of the present disclosure, it is considered that it is permanent in that it continues being present in low-power mode. Other circuits (memories, sensors, actuators, interfaces, transceivers, peripherals, etc.), not shown, are present in the device or system according to its application and are, according to their operating mode, powered with one and/or the other of voltages PVcc and CVcc.

In most current systems, as soon as the system is equipped with an operating system requiring an accurate system time, oscillator 5 and clock HSC remain powered to be able to keep the value of the system time (the value of counter 3) and more precisely to recover, at the awakening (coming out of the low-power mode), its value as if the system had not been in low-power mode. For this purpose, all the non-essential functions of the device are cut off, but the active system time is kept, including during standby periods. However, to further decrease the power consumption, it might be advantageous to be able to cut off oscillator 5 in low-power mode and thus to also cut off processor 1.

For this purpose, it is provided to provide the device with a mechanism for saving and restoring the system time (block 20, System Time Save & Restore). Thus, at the passing to the low-power mode, triggered by the operating system, and thus by the system time, the value of counter 3 is saved in a memory associated with controller 15 (included therein or external). This memory may be a volatile or non-volatile memory. In the case of a volatile memory, it however remains powered by the PVcc domain. The date (value of counter 9) of the passing to the low-power mode is also saved. Then, at the awakening (coming out of the low-power mode), the difference between the current date and the stored date is calculated and the obtained number is multiplied by the ratio between clocks HSC and LSC. The obtained value is then added to the saved value of counter 3 to recover the system time as if it had not stopped.

Such a mechanism may operate acceptably if the passages to the low-power mode are not too frequent, for example, every hour or every few minutes, or if the system is regularly reset. Indeed, during a reset, the system time is also reset (not the real time clock having its oscillator 11, counter 9, and quartz 13 generally battery-powered even if voltage PVcc disappears). However, in recent systems, it is desired to place the device in low-power mode as often as possible to minimize the power consumption. For example, it would be desired to be able to place the system in low-power mode up to several hundred times per second. The above mechanism then becomes incompatible with the preservation of the system time. Indeed, the update of the system time at the coming out of the low-power mode can only be performed by multiples of periods of the low speed clock (only the real time counter has remained active). This introduces an inaccuracy on the system time, that may reach several periods of clock HSC each time the low-power mode is left. Such a tolerance or inaccuracy may be considered as negligible when passages to the low-power mode are not too frequent, but is no longer so for frequent passages to the low-power mode.

According to embodiments, it is however provided to stop high speed clock HSC in low-power mode, but to synchronize the restoring of the system time on an edge of the low speed or real time clock. Generally, a passage to the low-power mode is triggered by the operating system, and thus by the system time. Thus, it is provided not only to synchronize the restoring of the system time on the real time clock, but also to synchronize the stopping of the system time (the stored value of counter 3) on the real time clock (on an edge of clock LSC). The interval between the stopping and restarting times then corresponds to an integer multiple of real time counter 9, which enables to keep the accuracy of the system time.

It may be considered prejudicial to delay the storing of the system time, and thus the stopping of the high speed clock, and to delay the restoring of the system time also until the next edge or a subsequent edge of the low speed clock.

However, this appears to be a negligible effect as compared with the gain in terms of power consumption and of kept accuracy of the system time.

According to the described embodiments block 20 is configured by processor 1 to:
- obtain and set the system time (read from and write into counter 3);
- obtain the real time (the value of counter 9);
- be triggered by controller 15; and
- receive the low speed clock LSC to synchronize the operations.

FIG. 1 shows certain functional links and power supply links between the blocks and circuits. Thus, circuits 1, 3, 5, and 7 are powered with voltage CVcc and circuits and blocks 9, 11, 13, 15, and 20 are powered with voltage PVcc. Low speed clock LSC, supplied by oscillator 11, sequences circuits and blocks 9, 15, and 20 while high speed clock HSC, supplied by oscillator 5, sequences circuits 1 and 3. The real time clock (value of counter 9) is accessible to processor 1, to controller 15, and to clock management unit/block 20. The system time (value of counter 3) is accessible to processor 1 and to block 20.

The system time saving and restoring function is for example implemented in software fashion by a program executed by controller 15. As a variant, a hardware execution may be provided, for example, by a state machine in wired logic.

Figure 2:
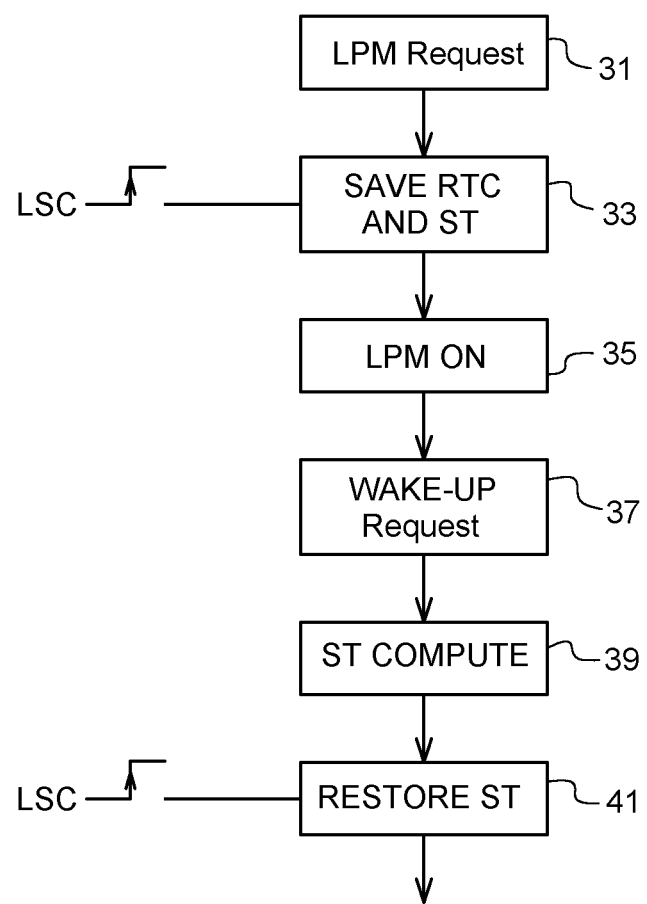
FIG. 2 shows a low-power mode management method according to embodiments.

FIG. 2 shows a low-power mode management method according to embodiments. More particularly, FIG. 2 illustrates steps implemented by the device during a transition to the low-power mode and a transition out of the low-power mode.

Figure 3:
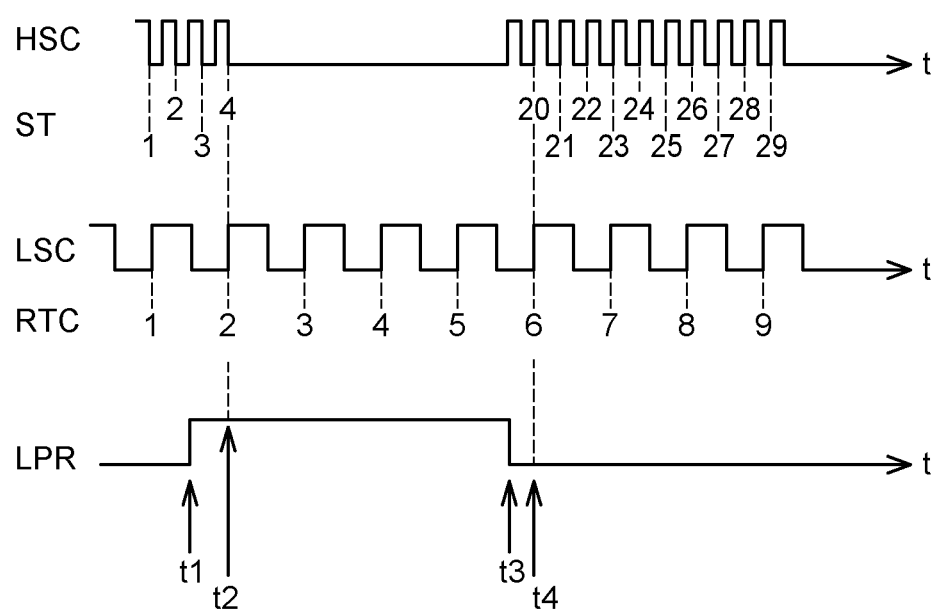
FIG. 3 illustrates timing diagrams according to embodiments.

FIG. 3 illustrates timing diagrams according to embodiments. More precisely, FIG. 3 illustrates examples of shapes of high speed clock signal HSC, of system time values ST, of low speed clock signal LSC, of values of real time clock counter RTC, and of a signal LPR (Low Power Request) for requesting to pass to the low-power mode and to leave this mode.

Arbitrarily, it is considered that counters ST and RTC are incremented on rising edges of their respective rating signals HSC and LSC. It however is a pure convention and the inverse is of course possible, be it on the increasing or decreasing character or on the incrementation/decrementation on a rising or falling edge. Similarly, it is arbitrarily assumed that a request to pass to the low-power mode corresponds to a passage to the high state (1) of signal LPR and that a request to leave the low-power mode corresponds to a passage to the low state (0) of signal LPR.

It is assumed that at a time t1 (FIG. 3), processor 1 requests a passage to the low-power mode (block 31, LPM Request, FIG. 2). This results in a rising edge of signal LPR and activating function 20. Function 20 causes the storage of the values of counters ST and RTC. However, this storage (block 33, SAVE RTC AND ST, FIG. 2) is not immediate, but is delayed to the next rising edge (time t2, FIG. 3) of clock LSC. Thus, in the shown example, it is assumed that the saved values of counters 3 and 9 are "4" and "2".

Relatively small values of the counters have been taken for simplification but, in practice, the values of the counters are over several tens of bits and the represented numbers are much higher. Similarly, for simplification, FIG. 3 shows an example of a relatively small ratio between clocks HSC and LSC while the ratio is in practice of several hundreds, or even several thousands. In particular, the representations of signals HSC and LSC of FIG. 3 are not to scale as to the ratio between these two signals.

At time t2 when the values are saved, the update of the system time counter stops due to the stopping of clock HSC. This corresponds to the setting to the low-power mode of the device (block 35, LPM ON, FIG. 2). From time t2, only the low-power functions are powered and only real time clock RTC is updated.

It is assumed that at a time t3 (FIG. 3), controller 15 receives a request for waking up or leaving the low-power mode (block 37, WAKE-UP Request, FIG. 2). Time t3 is not synchronized with clock LSC and occurs at any time in its period. At time t3, controller 15 causes the restarting of high speed clock HSC. From time t3, function 20 reads the stored values of counters 3 and 9 and calculates the interval between the saved value of the real time clock and the next expected value ("6" in the example of FIG. 3). Function 20, for example implemented by controller 15, then calculates the interval between the two values of the real time clock to deduce therefrom the number of periods of clock HSC, and thus the number of increments of the system time which have elapsed since time t2 (block 39, ST COMPUTE, FIG. 2). At the next rising edge (time t4, FIG. 3) of clock LSC, function 20 restores (block 41, RESTORE ST, FIG. 2) or forces the value of counter 3, and thus of the system time. In the shown example, a ratio of 4 between clocks HSC and LSC is assumed and the restored value of the system time is thus "20". From time t4, the device has restarted and remains in this state until the next passage to the low-power mode.

According to an embodiment, clocks HSC and LSC are not synchronized. There may exist a slight offset between the value of the restored system time and the value that it would have had if clock HSC had not been stopped. However, this offset is negligible as compared with the offset which would exist without this synchronization.

According to another embodiment, a hardware mechanism (circuit) synchronizes clocks HSC and LSC so that they have a zero offset.

According to an embodiment, function 20 has a software implementation. In this case, the executed program takes into account clock HSC to save the exact values (time t2) of counters 3 and 9 for the entering into the low-power mode and perform a restoring of the counter of high speed clock HSC at the coming out of the low-power sequence.

According to another implementation mode, a hardware implementation (total or partial) and a hardware synchronization of clocks LSC and HSC programmed in software fashion are provided. For example, the program launches a command for triggering the acquisition of the value of counter 3 at the next edge of clock LSC and confirms the acquisition of the counter state by a status bit. The saved value is used in software fashion to calculate the interval and store counter 3 on an edge of clock LSC.

Whatever the selected implementation mode, the times of storage access and of reading of the different counters are preferably taken into account to restore the system time.

According to a preferred embodiment, the calculation path time is further taken into account to determine the period of clock LSC at which to trigger the restarting of the system time and to estimate this system time value to be restored. Thus, taking into account the different calculation times optimizes the accuracy, that can be decreased to less one period of clock HSC, which is perfectly negligible over the system operation.

Thus, the edges (time t2 and t4) of switching into and out of the low-power mode may not correspond to the edges directly following times t1 and t3, but may occur later according to the processing times taken into account. It is however easy to estimate this processing time, whether it is limited to the access times between counters and memories or whether it also takes into account the calculation paths. Indeed, this processing time remains the same since the operations are each time identical.

An advantage of the described embodiments is that they further decrease the power consumption in low-power mode with respect to usual devices and systems.

Another advantage of the described embodiments is that they improve the accuracy in which a system time may be recovered at the output of the low-power mode.

Another advantage of the described embodiments is that their implementation is possible in software fashion in existing devices.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereabove. In particular, the choice between a purely software, mixed, or purely hardware implementation depends on the application and on the resources available therein.

What is claimed is:

1. A method for managing a low-power mode of an electronic device comprising a processor, a first counter and a second counter, the method comprising:
    driving, by a first oscillator, the first counter with a first clock;
    driving, by a second oscillator, the second counter with a second clock, the second clock being faster than the first clock;
    at a first request for transitioning the electronic device to the low-power mode:
        storing values of the first and second counters on a first edge of the first clock;
        stopping power to the second counter; and
        deactivating the second oscillator; and
    at a second request for transitioning the electronic device out of the low-power mode:
        activating the second oscillator;
        powering the second counter;
        calculating a number of periods of the second clock between a second edge of the first clock and the first edge, the second edge being later than the first edge; and
        updating the value of the second counter with a calculated value.

2. The method according to claim 1, wherein updating the value of the second counter comprises updating the value of the second counter on an edge of the first clock.

3. The method according to claim 1, wherein the first counter is a real time counter, and wherein the second counter is a system time counter.

4. The method according to claim 3, wherein the system time counter is used by the processor when the electronic device is not in the low-power mode.

5. The method according to claim 1, wherein the first clock is activated in the low-power mode, and wherein the second clock is deactivated in the low-power mode.

6. The method according to claim 1, wherein the value of the second counter is updated by a clock management unit.

7. The method according to claim 1, wherein the processor is deactivated in the low-power mode while a low-power mode controller of the electronic device is activated.

8. The method according to claim 1, wherein calculating the number of periods of the second clock between the first and second edges of the first clock comprises:
    reading the stored values from a memory;
    calculating an interval between the second edge and the first edge based on a number of periods of the first clock;
    deducing from the interval the number of periods of the second clock elapsed since the value of the second counter was stored; and
    calculating the value of the second counter.

9. An electronic device comprising:
    a processor;
    a low-power controller;
    a memory associated with the low-power controller;
    a first oscillator configured to use a first clock to drive a first counter;
    a second oscillator configured to use a second clock to drive a second counter; and
    a clock management unit configured to:
        at a first request for transitioning the electronic device to a low-power mode by the processor:
            store, at the memory, values of the first and second counters on a first edge of the first clock;
            stop power to the second counter; and
            deactivate the second oscillator;
        at a second request for transitioning the electronic device out of the low-power mode by the low-power controller:
            activate the second oscillator;
            power the second counter;
            calculate a number of periods of the second clock between a second edge of the first clock and the first edge, the second edge being later than the first edge; and
            update the value of the second counter with a calculated value, and wherein the second clock is faster than the first clock.

10. The electronic device according to claim 9, wherein the value of the second counter is updated on an edge of the first clock.

11. The electronic device according to claim 9, wherein the first counter is a real time counter and the second counter is a system time counter.

12. The electronic device according to claim 11, wherein the processor is configured to perform based on the system time counter when the electronic device is not in the low-power mode.

13. The electronic device according to claim 9, wherein the first clock is activated in the low-power mode, and wherein the second clock is deactivated in the low-power mode.

14. The electronic device according to claim 9, wherein the processor is deactivated in the low-power mode while the low-power controller is activated.

15. The electronic device according to claim 9, wherein the clock management unit is configured to:
    read the stored values from the memory;
    calculate an interval between the second edge and the first edge based on a number of periods of the first clock;
    deduce from the interval the number of periods of the second clock elapsed since the value of the second counter was stored; and
    calculate the value of the second counter.

16. A non-transitory computer readable storage medium storing a program to be executed by a processor, the program includes instructions for:

driving, by a first oscillator, a first counter with a first clock;

driving, by a second oscillator, a second counter with a second clock, the second clock being faster than the first clock;

at a first request for transitioning an electronic device to a low-power mode:

storing values of the first counter and the second counter of the electronic device on a first edge of the first clock;

stopping power to the second counter; and deactivating the second oscillator; and at a second request for transitioning the electronic device out of the low-power mode:

activating the second oscillator;

powering the second counter;

calculating a number of periods of the second clock between a second edge of the first clock and the first edge, the second edge being later than the first edge; and updating the value of the second counter with a calculated value.

17. The non-transitory computer readable storage medium according to claim 16, wherein the first clock is activated in the low-power mode, and wherein the second clock is deactivated in the low-power mode.

18. The non-transitory computer readable storage medium according to claim 16, wherein the processor is deactivated in the low-power mode while a low-power mode controller of the electronic device is activated.

19. The non-transitory computer readable storage medium according to claim 16, wherein the instructions for calculating the number of periods of the second clock between the first and second edges of the first clock comprises instructions for:

reading the stored values from a memory;

calculating an interval between the second edge and the first edge based on a number of periods of the first clock;

deducing from the interval the number of periods of the second clock elapsed since the value of the second counter was stored; and calculating the value of the second counter.

20. The non-transitory computer readable storage medium according to claim 16, wherein the instructions for updating the value of the second counter comprise instructions for updating the value of the second counter on an edge of the first clock.

\* \* \* \* \*